United States Patent Office 2,768,604
Patented Oct. 30, 1956

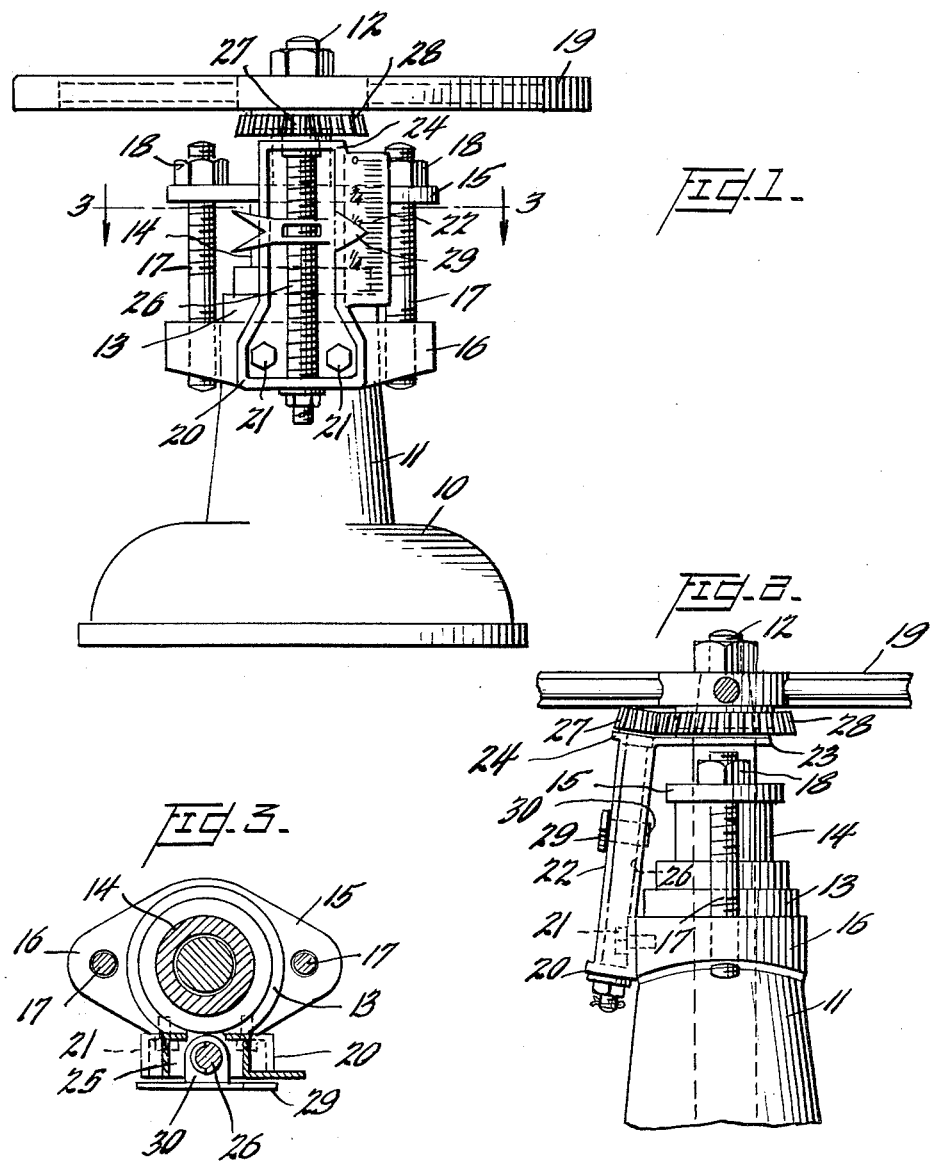

2,768,604

INDICATORS FOR GATE VALVES OF THE NON-RISING STEM TYPE

Olaf Carl Enerud, Stamford, Conn.

Application December 11, 1953, Serial No. 397,723

5 Claims. (Cl. 116—125)

This invention relates to indicators for gate valves of the non-rising stem type, which are employed in many applications, and particularly in marine installations.

Gate valves with non-rising stems are used, primarily, in locations in which conventional gate valves of the kind in which the stem rises as the valve is opened, cannot be used because of space limitations. For example, the difference in height between 4-inch gate valves with outside screw and yoke, and 4-inch gate valves with non-rising stems, is approximately 7 inches.

However, non-rising stem gate valves for marine installations and many other installations must be equipped with indicators to show whether the valves are open or shut, and the degree of opening. Conventional indicators used on non-rising stem valves may comprise, for example, an internally threaded member engaged with the valve stem above the yoke and adapted to be moved in an axial direction by rotation of the valve stem. In such an arrangement, of course, the valve stem must be lengthened by the extent of movement of the indicator from open to closed position, which means that non-rising stem valves having such indicators must have stems which are from 2 inches to 3 inches longer than would otherwise be required. Also, in order to minimize the length of the stem, the pointer of the indicator is made to operate over a very short scale, and thus is difficult to read from any distance.

It is an object of present invention to provide an indicator for gate valves of the non-rising stem type, so arranged that no lengthening of the stem is necessary, but the over-all dimensions of the valve may be maintained at a minimum value. Another object is the provision of an indicator of the type described, in which the scale may be made of any desired length, i. e., the range of movement of the indicator pointer may be made sufficiently great as to make the indicator readable from any reasonable distance.

More specifically, it is an object of the invention to provide an indicator for gate valves of the non-rising stem type, in which the pointer of the indicator has threaded engagement with a threaded shaft disposed adjacent to and substantially parallel to the valve stem, which shaft is operatively connected to be rotated in proportion to the rotations of the valve stem, so that the pointer may be made to rise and fall accordingly. Suitably, the said operative connection may be in the form of a toothed member carried on the valve stem, and a complementary toothed member secured on the said shaft, the range of movement of the pointer being determined by the gear ratio between the two toothed members and the thread pitch of the threaded shaft.

Other and further objects, features and advantages will be apparent from the description which follows, read in connection with the accompanying drawings in which:

Figure 1 is a front elevation of the upper portion of a gate valve and indicator according to the present invention;

Figure 2 is a partial side elevation of the device of Figure 1; and

Figure 3 is a horizontal section on line 3—3 of Figure 1.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The drawings illustrate only the upper portion of a gate valve of the non-rising stem type, the lower portion being conventional and well known. The said upper portion comprises a housing 10 having a neck 11 through which a valve stem 12 extends, with the customary stuffing box 13 (Figure 2) and gland 14. This assemblage is secured by means of a plate 15 which is clamped to the flange 16 of the neck 11 by means of studs 17 and nuts 18. The valve stem 12 is provided with handle means in the form of a hand wheel 19. The elements described thus far are conventional.

The indicator means provided by the present invention comprises a bracket 20 secured to the flange 16, for example by means of fasteners 21, which bracket is formed to provide a scale 22, which may be suitably graduated, an extension 23 encircling the valve stem 12, and bearings 24 and 25, respectively, for the threaded shaft 26. The latter carries, at its upper extremity, a toothed pinion 27 which meshes with a gear 28 secured to the wheel 19 or to the stem 12 immediately below the wheel 19. As best seen in Figure 2, the gear 28 and pinion 27 are slightly bevelled to permit the shaft 26 to incline somewhat inwardly toward the valve stem, in order to minimize interference with the manipulation of the wheel 19, and also to permit the gear 28 to be of sufficiently small diameter to allow clearance for the removal of nuts 18 for the purpose of re-packing the valve.

A pointer 29 provided with an internally threaded apertured lug 30 is operatively engaged with the threaded shaft 26 so as to move upwardly and downwardly in accordance with rotations of the latter, which in turn are proportional to rotations of the valve stem 12. The pointer 29 thus indicates, on the scale 22, the position of the valve member controlled by the valve stem 12. As mentioned above, the length of the scale 22 and proportionality between the movements of the pointer 29 and rotations of the valve stem 12 may be fixed as desired, being controlled by the ratio between the pinion 27 and gear 28, and the pitch of the threaded engagement between the shaft 26 and pointer 29.

As will be readily appreciated, the provision, on a gate valve of the non-rising stem type, of an indicator constructed in accordance with the present invention does not require alteration of the over-all dimensions of the valve, nor does it impede in any way the proper manipulation of the valve.

Having thus described the invention, what is claimed as new and desired to be secured by Letters Patent is:

1. Position indicator for gate valves of the non-rising stem type, comprising a threaded shaft disposed externally of said valve and adjacent to and substantially parallel to the stem thereof, means supporting said shaft for rotational, non-axial movement, an indicator member in threaded engagement with said shaft, a stationary scale mounted on said valve in cooperative relation to said indicating member, and means operatively connecting said shaft to the stem of said valve.

2. Device according to claim 1, said last means comprising a toothed member mounted to rotate with said stem and a second toothed member secured on said shaft and engaging said first toothed member.

3. Position indicator for gate valves of the non-rising stem type having a movable valve element, a rotatable stem for moving said element, a housing enclosing said element, said stem extending outwardly of said housing, and handle means on said stem outside said housing, said position indicator comprising a scale mounted externally of said housing, an indicator member movable over said scale, a threaded shaft mounted adjacent said scale for rotation about an axis substantially parallel thereto, said shaft operatively engaging said indicator member, and means operatively connecting said shaft and said stem for rotating said shaft in proportion to the rotation of said stem.

4. Position indicator for gate valves of the non-rising stem type having a movable valve element, a rotatable stem for moving said element, a housing enclosing said element, said stem extending outwardly of said housing, and handle means on said stem outside said housing, said position indicator comprising a scale mounted externally of said housing, an indicator member movable over said scale, a threaded shaft mounted adjacent said scale for rotation about an axis substantially parallel thereto, said shaft operatively engaging said indicator member, and means operatively connecting said shaft and said stem for rotating said shaft in proportion to the rotation of said stem, said last means comprising a toothed member encircling said stem and secured to said handle means, and a meshing toothed member secured on said shaft.

5. Device according to claim 4, including a bracket secured to said housing, said bracket being formed to provide bearings for said shaft and a portion encircling said stem.

References Cited in the file of this patent

UNITED STATES PATENTS

| | | |
|---|---|---|
| 467,796 | Ferrell | Jan. 26, 1892 |
| 684,191 | Chatham | Oct. 8, 1901 |
| 1,131,885 | Wingett | Mar. 16, 1915 |
| 1,526,538 | Ford | Feb. 17, 1925 |